United States Patent

Duret et al.

[11] Patent Number: 5,273,004
[45] Date of Patent: Dec. 28, 1993

[54] TWO-STROKE ENGINE WITH ROTARY VALVES AND USES OF SUCH AN ENGINE

[75] Inventors: Pierre Duret, Paris; Andre Douaud, Mareil Marly, both of France

[73] Assignee: Institut Francais Du Petrole, Rueil-Malmaison Cedex, France

[21] Appl. No.: 990,027

[22] Filed: Dec. 14, 1992

Related U.S. Application Data

[63] Continuation of Ser. No. 546,831, Jul. 2, 1990, abandoned.

[30] Foreign Application Priority Data

Mar. 30, 1989 [FR] France .................. 89 08853

[51] Int. Cl.$^5$ .................. F01L 7/00
[52] U.S. Cl. .................. 123/73 V; 123/65 BA; 123/190.2
[58] Field of Search ............ 123/65 V, 65 A, 65 VD, 123/65 VB, 65 BA, 190.2, 73 V

[56] References Cited

U.S. PATENT DOCUMENTS

| | | | |
|---|---|---|---|
| 2,110,754 | 3/1938 | Alston | 123/65 BA |
| 4,163,438 | 8/1979 | Guenther et al. | 123/190.2 |
| 4,545,337 | 10/1985 | Lyons et al. | 123/190.2 |
| 4,562,796 | 1/1986 | Eickmann | 123/65 VB |
| 4,622,928 | 11/1986 | Uchinishi | 123/190.2 |
| 4,864,984 | 9/1989 | Blish | 123/190.2 |
| 4,987,864 | 1/1991 | Cantrell et al. | 123/190.2 |
| 4,995,354 | 2/1991 | Morikawa et al. | 123/65 V |
| 5,003,942 | 4/1991 | Hansard | 123/190.2 |
| 5,105,775 | 4/1992 | Maissant | 123/73 V |

Primary Examiner—Tony M. Argenbright
Assistant Examiner—M. Macy
Attorney, Agent, or Firm—Antonelli, Terry, Stout & Kraus

[57] ABSTRACT

A two-stroke engine comprising at least one cylinder having a combustion chamber, an exhaust duct connected to the combustion chamber, at least one duct for the intake of fresh gas compressed by a compression device for delivering said fresh compressed gas, at least a first rotary valve opens and closes the exhaust duct and at least a second rotary valve feeds fluid into the combustion chamber.

12 Claims, 3 Drawing Sheets

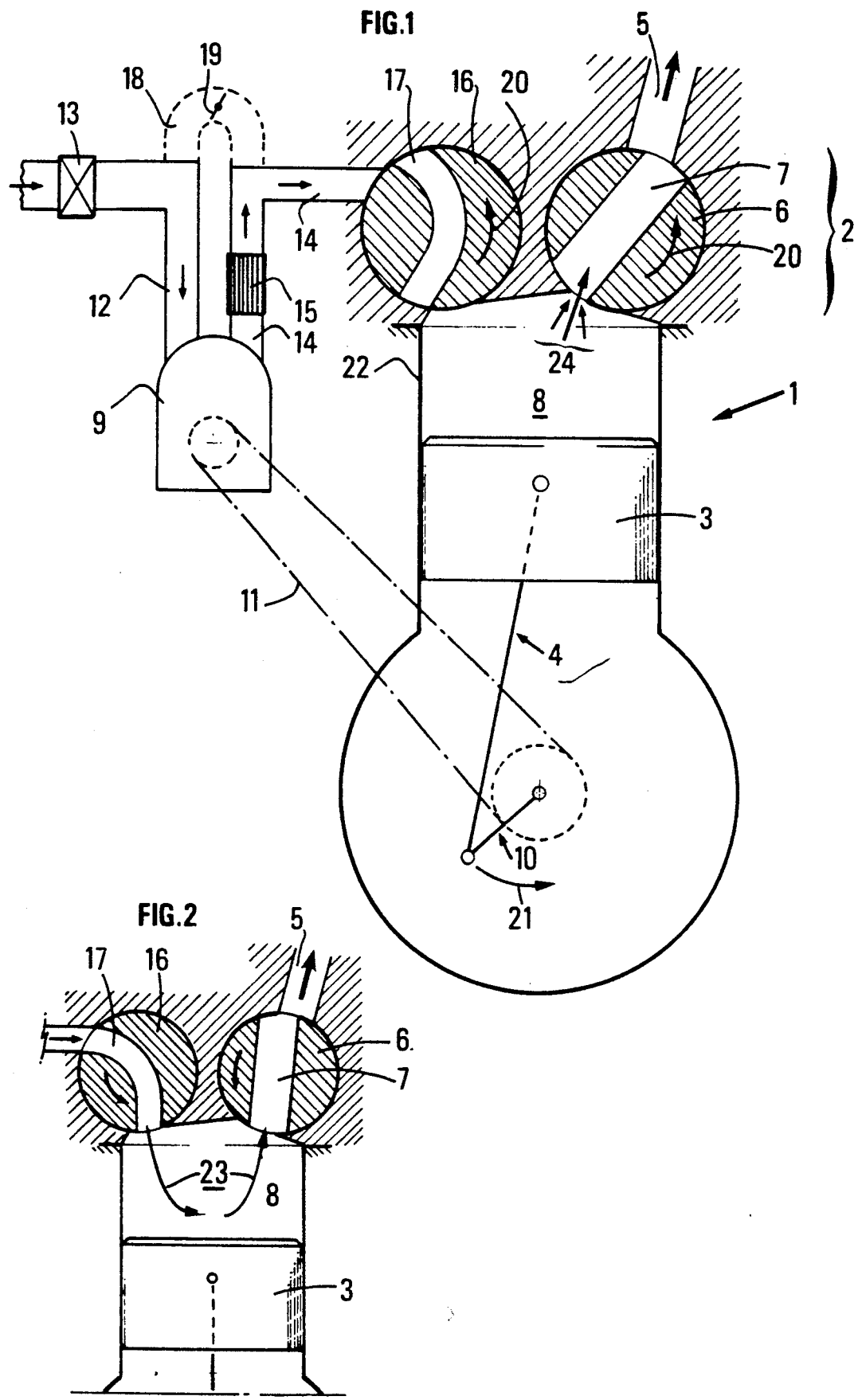

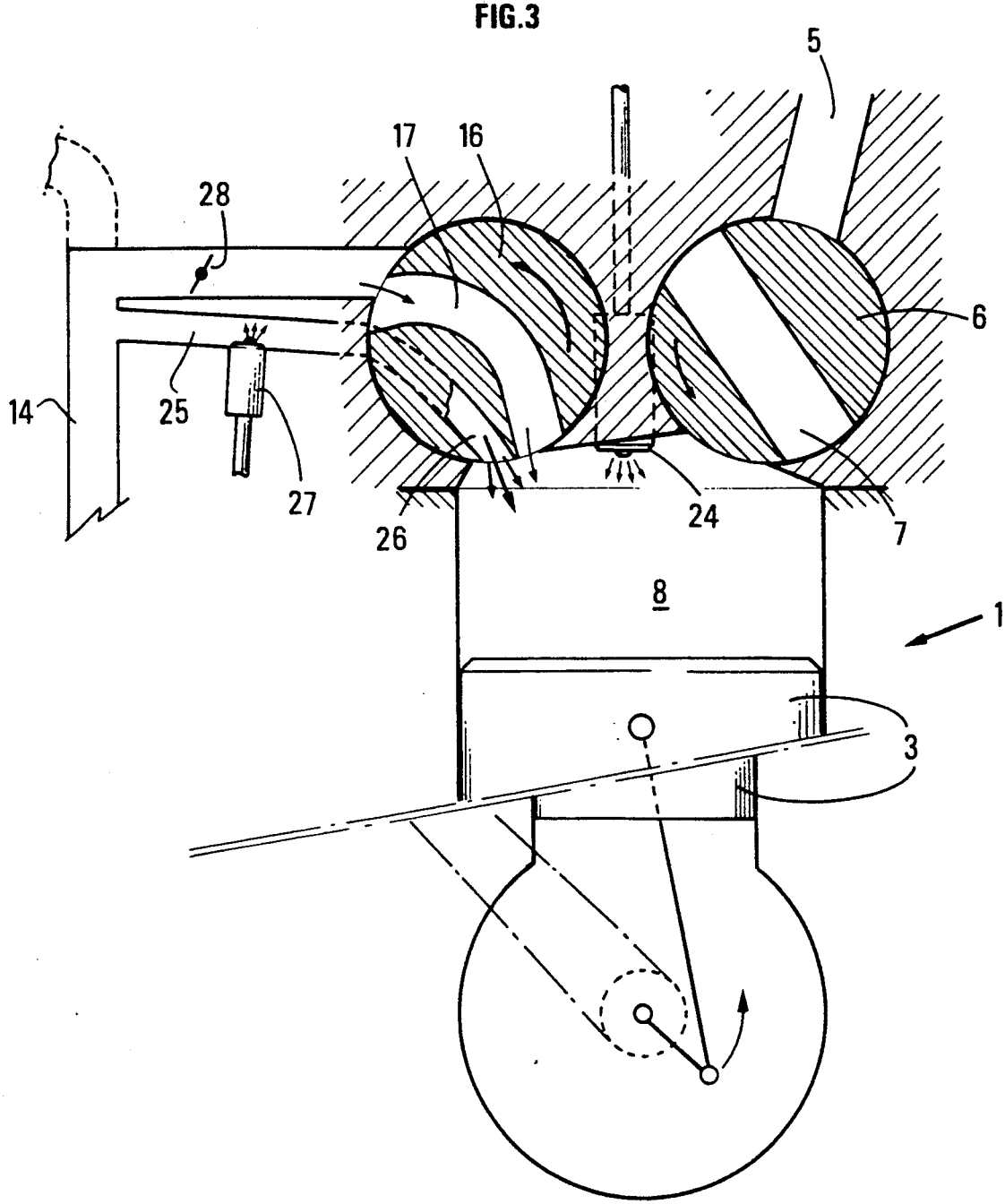

TWO-STROKE ENGINE WITH ROTARY VALVES AND USES OF SUCH AN ENGINE

This is a continuation of application Ser. No. 546,831 filed Jul. 2, 1990, now abandoned.

BACKGROUND OF THE INVENTION

The present invention relates to a two-stroke engine in which the distribution is provided particularly by rotary valves.

The fuel supply may be provided by direct injection into the cylinder, by pneumatic or liquid injection.

In addition, the engine may be a petrol or diesel engine and may serve for powering automobile vehicles.

Furthermore, the device of the invention is applicable for transforming a four stroke engine into a two-stroke engine. One of the problems met with in particular during such transformation is the limitation at speed of the valve distributions for which the critical speed is rapidly reached since, for such transformation, for equal engine (crankshaft) speed, the valves in a two-stroke engine are subjected to twice the operating frequencies than in a four-stroke engine.

In addition, some embodiments according to the present invention reduce the losses through the exhaust pipe of carburetted mixture during the scavenging phase.

Thus, the present invention relates to a two-stroke engine comprising at least one cylinder having a combustion chamber, an exhaust duct connected to said combustion chamber, at least one duct for the intake of fresh compressed gas, and compression means for delivering said fresh compressed gas.

SUMMARY OF THE INVENTION

According to the invention, this engine comprises in combination at least a first rotary valve for opening and closing said exhaust duct and at least a second rotary valve for feeding fluid into said combustion chamber.

The second rotary valve may be connected to the compression means and the fluid may correspond to the fresh compressed gases.

The engine may comprise a high pressure liquid injector.

The engine may comprise a pneumatic injection device possibly controlled by a solenoid.

The engine of the invention may comprise fuel injection or metering means and the second rotary valve may comprise two passages, the first of which may be connected to the compression means through a first circuit and the second of which is connected to the compression means by a second circuit comprising the fuel injection or metering means. The second passage into the combustion chamber may open later than that of the first passage.

The second rotary valve may be connected to the compression means by a first circuit comprising fuel supply means and the engine may further comprise a second circuit for supplying the cylinder with fresh non carburetted gas. This second circuit may connect the compression means to a port formed in the walls of the cylinder at the low part of the combustion chamber. The second circuit may comprise a valving means.

At least one of the rotary valves may be housed in the top part of the combustion chamber, particularly in the cylinder head. The first rotary valve may comprise two passages.

The engine according to the invention may be a petrol or diesel engine, namely fed with gas oil.

BRIEF DESCRIPTION OF THE DRAWINGS

The present invention will be better understood and its advantages will be clearer from the following description of examples which are in no wise limitative, illustrated by the accompanying drawings in which:

FIGS. 1-3 are schematic partial cross-sectional views of a first embodiment of the present invention.

Figure 4:
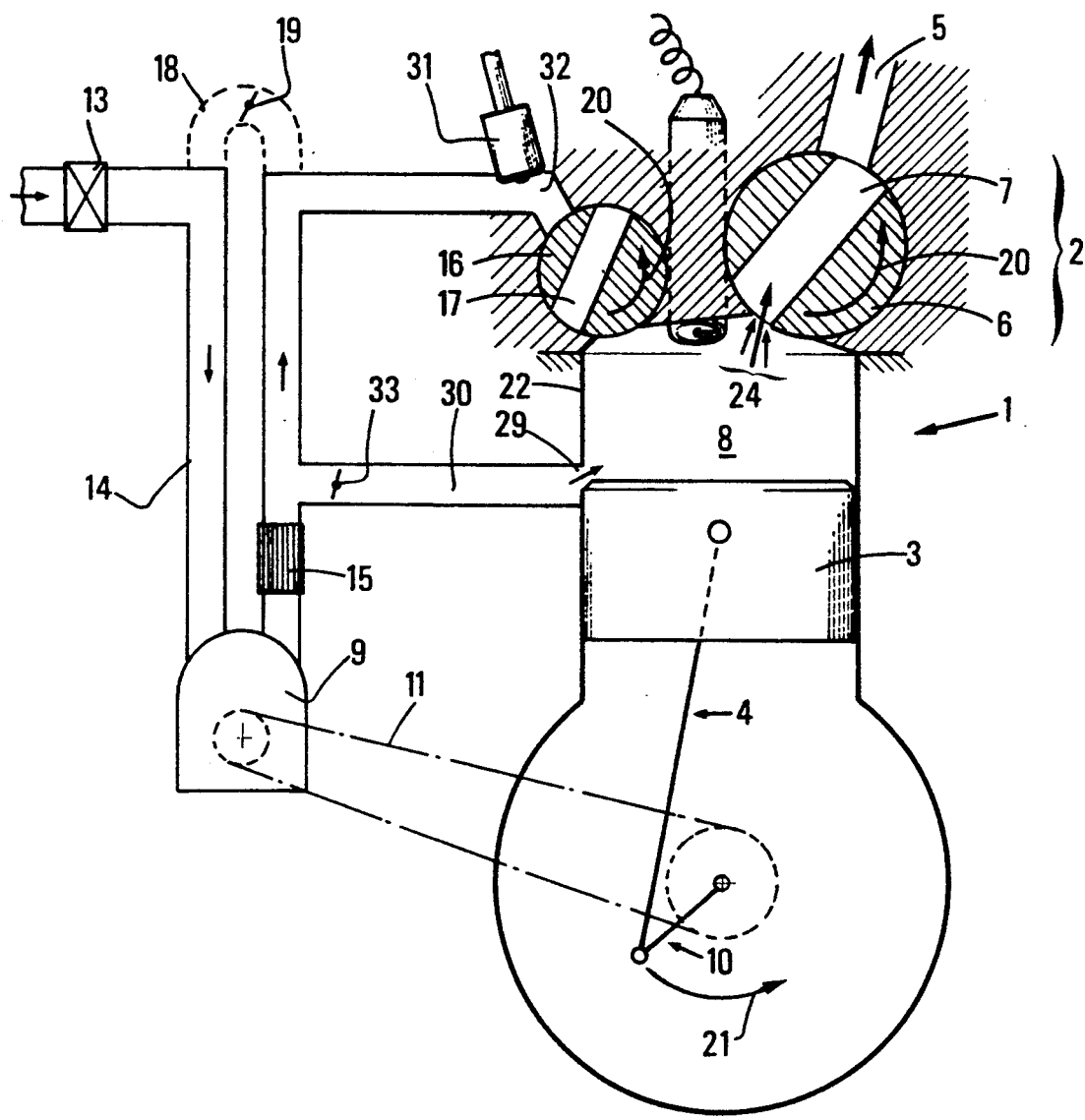
FIGS. 4-6 are schematic partial cross-sectional views of another embodiment of the present invention comprising a port for feeding gas into the cylinder.

DESCRIPTION OF THE PREFERRED EMBODIMENTS.

FIG. 1 shows a cylinder 1 of an engine according to the invention with the engine comprising a cylinder head 2, a piston 3, a connecting rod system 4 and exhaust pipe 5.

A rotary valve 6 is disposed in the exhaust of cylinder 1. With the rotary valve 6 comprising a passage 7 which places the combustion chamber 8 and exhaust pipe 5 periodically in relation when the combusted gases need to be removed from the combustion chamber 8.

This engine comprises an external mechanical compressor 9 driven from the crankshaft 10 by drive means 11, such as a belt. This compressor 9 is fed with air by duct 12 through an air filter 13. Duct 14 serves for supplying the combustion chamber 8 with fresh gas. The duct 14 may comprise means 15 for cooling the fresh gases after compression.

In the embodiment of FIG. 1, the fresh air supply for the combustion chamber 8 is provided by a rotary valve 16 connected to duct 14. This rotary valve comprises a passage 17 which may be profiled to facilitate the flow of the fluid and avoid sudden changes of direction of the flow. In addition, the intake rotary valve 16 may have a shape designed to feed the air while orienting it first of all towards wall 22, then more and more towards the middle of the combustion chamber 8 and thus create a scavenging loop, as shown in FIG. 2 by arrows 23.

The rotary valves 6 and 16 are housed in the cylinder head 2.

According to the present invention, the rotary valves 6,16 are driven in rotation from crankshaft 10, for example through a timing chain or a toothed belt.

Optionally, ducts 12 and 14 may be connected by a by-pass 18 controlled by a flap valve 19. The by-pass 18 is shown with broken lines.

FIG. 1 shows the time in the cycle corresponding to the beginning of opening of the exhaust rotary valve 6 which occurs in advance with respect to the opening of the intake rotary valve 16.

Arrows 20 show the direction of rotation of the rotary valve and arrow 21 the direction of rotation of the crankshaft with the arrows 24 showing the exhaust gases which leave the combustion chamber 18.

FIG. 2 shows the same engine as FIG. 1, when the piston is at bottom dead center. This corresponds to the phase of scavenging the combustion chamber with the scavenging being illustrated by arrows 23.

FIG. 3 shows cylinder 1, with exhaust closed and at the end of the intake phase. In FIG. 3, two fuel supply systems have been shown, but it should be noted that one of these systems excludes the other.

The first system provides direct injection in the combustion chamber 8 by a high pressure injector 24.

Typically, this injector and its feed pump deliver a jet under a pressure between 50 and 100 bars for a petrol engine and a few hundred bars for a diesel engine.

Pneumatic injection may also be provided directly into the combustion chamber, particularly with a feeding pressure typically between 2 and 10 bars.

In another variant excluding the preceding ones, the fuel is delivered by an injector or metering means upstream of the combustion chamber 8 and rotary valve 16. Such injection may be made in duct 14, or better still in an auxiliary duct 25.

In this latter case, the rotary valve 16 has a double passage and comprises, in addition to passage 17, a passage 26.

Passage 26 provides delayed intake with respect to passage 17. Thus, double feed by rotary valve 16 (FIG. 3) is obtained, one being produced by the passage 17, shortly after the beginning of the exhaust phase, with compressed air alone for scavenging and filling the cylinder 8, whereas, the other feed provided by passage 26 is offset in the cycle for feeding pneumatic carburetted mixture.

The fuel is fed by injector 27. Valving 28 (FIG. 3A) may be provided for adjusting the pure air flow to the carburetted mixture and, for example, reducing it preferably when the engine load decreases.

Similarly, the exhaust rotary valve may comprise two passages forming exhaust openings offset in the cycle. The passages of these rotary valves may be connected at the output to two ducts one of which could be opened or closed by a valving device (not shown). The result would be the simple possibility of having two different exhaust opening patterns to choose from depending on the load and operating speed conditions.

In all cases, the exhaust passages are preferably set disymmetrically with respect to the bottom dead center (BDC) and the angular amplitude of their opening is greater before BDC than after.

The common elements between FIGS. 1 and 4 bear the same references.

The embodiment of FIG. 4 is distinguished from that of FIG. 1 in that cylinder 1 comprises at least one port 29 controlled by piston 13 and connected by a duct 30 to the compressed air intake pipe 14. This duct 30 permits scavenging and filling of cylinder 1. The intake rotary valve 16 serves for controlling the feeding of the air/fuel mixture obtained by pneumatic injection. Such injection is obtained by a fuel injector or metering means 31 which delivers the fuel into the auxiliary duct 32.

The pure air or fresh gas intake through port 29 may be valved by a valve 33 when the load decreases and may even be completely closed. The cylinder is then only supplied with the carburetted mixture passing through rotary valve 16 (FIG. 4).

Figure 5:
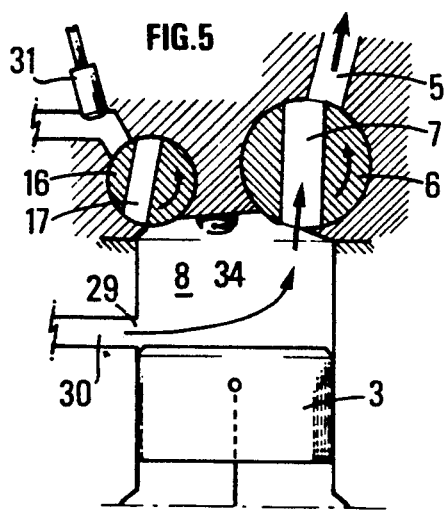

FIG. 5 shows the cylinder when the port 29 is open and when the rotary valve 16 does not yet allow the carburetted mixture to pass.

Arrows 34 show the scavenging and filling of the cylinder of combustion chamber 8.

Figure 6:
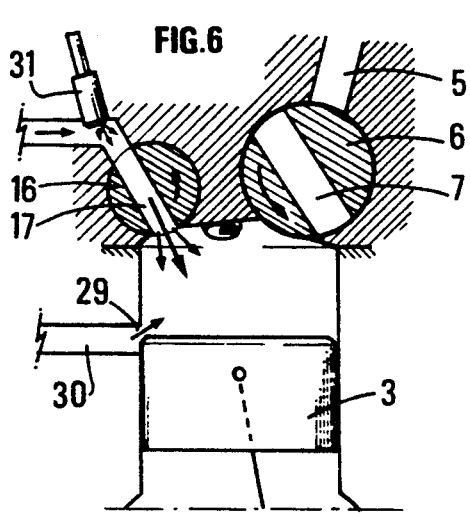

In FIG. 6, the exhaust rotary valve 6 is positioned so the mixture may be injected through passage 17 of rotary valve 16. The risks of carburetted mixture losses are removed.

The operation of the two proposed embodiments is given hereafter.

During an expansion phase, after combustion, the exhaust 5 opens first (FIG. 1). The piston continues its downward travel. The intake of fresh gas alone (not carburetted) through the rotary valve then occurs. This gas is fed under pressure through a rotary valve 16 (FIG. 1) or a port 29 (FIG. 4). In the case of a port uncovered by movement of the piston, the opening pattern will be substantially symmetrical. The feeding of such air scavenges the cylinder and drives the burnt gases out towards exhaust, as shown in FIGS. 2 and 5. Then, this air participates in the filling of the cylinder, particularly after closure of the exhaust.

The fuel is fed preferably after the closure of the exhaust ( which may possibly begin close thereto).

Different solutions are possible:

through a duct in the rotary valve, the pneumatic mixture supply is formed of compressed air delivered by the compressor and fuel metered by a cyclic metering device, through a pneumatic injector comprising a small valve controlled by a solenoid, or by any other mechanically controlled means (FIGS. 1 to 3), through a high pressure liquid injector (FIGS. 1 to 3). In this case, operation on the diesel principle is possible.

The rotary valves according to the invention may be equipped with a system for sealing with respect to the combustion chamber. This system may be such as those described in patents FR 2 531 174 or FR 2 123 968.

What is claimed is:

1. A two-stroke engine comprising:
   at least one cylinder having a combustion chamber,
   an exhaust duct connected to said combustion chamber,
   at least one duct for the intake of fresh gas compressed by compression means for delivering said fresh compressed gas,
   at least a first rotary valve for opening and closing of said exhaust duct,
   at least a second rotary valve for feeding fluid into said combustion chamber, and
   fuel injection or metering means,
   wherein said second rotary valve includes two passages, a first of said two passages is connected to the compression means through a first circuit and a second of said two passages is connected to the compression means by a second circuit comprising said fuel injection or metering means, and
   wherein an opening of said second passage into the combustion chamber takes place after that of the first passage.

2. The engine according to claim 1, wherein the engine is a diesel engine.

3. The engine as claimed in claim 1, wherein said second rotary valve is connected to compression means and said fluid corresponds to said fresh compressed gases.

4. The engine as claimed in claim 1, wherein the fuel injection or metering means includes a pneumatic injection device controlled by a solenoid.

5. The engine as claimed in claim 1, wherein the fuel injector or metering means includes a high pressure liquid injector.

6. A two-stroke engine comprising:
   at least one cylinder having a combustion chamber,
   an exhaust duct connected to said combustion chamber,
   at lest one duct for the intake of fresh air compressed by compression means for delivering said fresh compressed gas,
   at least a first rotary valve for opening and closing of said exhaust duct, and wherein said second rotary valve is connected to the compression means by a first circuit comprising fuel supply means, and wherein said engine has a second circuit for supplying the cylinder with fresh non-carburetted gas, said second circuit connecting the compression means to a port formed in a wall of the cylinder at a low portion of the combustion chamber.

7. The engine as claimed in claim 6, which said second circuit comprises a valving means.

8. The engine as claimed in one of claims 1, 6 or 7, wherein at least one of said rotary valves is housed in a top portion of the combustion chamber.

9. The engine as claimed in claim 8, wherein the top part of the combustion chamber includes a cylinder head.

10. The engine as claimed in one of claims 1, 6 or 7, wherein said second rotary valve comprises two passages.

11. The engine according to one of claims 6 or 7, wherein the engine is a petrol engine.

12. Two-stroke engine comprising:
at least one cylinder having a combustion chamber,
an exhaust duct connected to said combustion chamber,
at least one intake duct for the intake of fresh gas compressed by compression means for delivering said fresh compressed gas,
at least a first rotary valve for entirely controlling an opening and closing of said exhaust duct,
at least a second rotary valve including at least one passage for enabling a direct injecting of fluid into said combustion chamber in such a manner so as to form a scavenging loop between the intake duct and the exhaust duct,
wherein said second rotary valve is connected to said compression means and said fluid corresponds to said fresh compressed gases, and
wherein said second rotary valve comprises two passages.

* * * * *